United States Patent
Wu

(10) Patent No.: US 10,604,060 B2
(45) Date of Patent: Mar. 31, 2020

(54) HEADLAMP SYSTEM CAPABLE OF BEING CONTROLLED BY A PORTABLE ELECTRONIC DEVICE

(71) Applicant: COPLUS INC., New Taipei (TW)

(72) Inventor: Jacob Wu, Tainan (TW)

(73) Assignee: COPLUS INC., New Taipei (TW)

( * ) Notice: Subject to any disclaimer, the term of this patent is extended or adjusted under 35 U.S.C. 154(b) by 0 days.

(21) Appl. No.: 16/162,306

(22) Filed: Oct. 16, 2018

(65) Prior Publication Data

US 2019/0118699 A1   Apr. 25, 2019

(30) Foreign Application Priority Data

Oct. 20, 2017  (TW) .............................. 106136180 A

(51) Int. Cl.
*B60Q 1/076* (2006.01)
*H05B 37/02* (2006.01)
*H05B 33/08* (2020.01)

(52) U.S. Cl.
CPC ......... *B60Q 1/076* (2013.01); *H05B 33/0842* (2013.01); *H05B 37/0272* (2013.01)

(58) Field of Classification Search
CPC ........................... B60Q 1/076; H05B 37/0272
See application file for complete search history.

(56) References Cited

U.S. PATENT DOCUMENTS

2018/0154821 A1*  6/2018  Miller .................. B60Q 1/1423
2019/0041038 A1*  2/2019  White ..................... F21V 14/02

* cited by examiner

*Primary Examiner* — Joseph L Williams
(74) *Attorney, Agent, or Firm* — DLA Piper LLP (US)

(57) ABSTRACT

A headlamp system includes a headlamp device mounted on a vehicle, and an application program stored in a portable electronic device. The portable electronic device executes the application program to display a control interface including a plurality of options related respectively to a plurality of headlamp parameter sets. In response to user selection of one of the options, the portable electronic device outputs a corresponding one of the headlamp parameter sets related to said one of the options to the headlamp device. In response to receipt of the corresponding one of the headlamp parameter sets, the headlamp device emits light based on the headlamp parameter set.

13 Claims, 2 Drawing Sheets

HEADLAMP SYSTEM CAPABLE OF BEING CONTROLLED BY A PORTABLE ELECTRONIC DEVICE

CROSS-REFERENCE TO RELATED APPLICATION

This application claims priority to Taiwanese Patent Application No. 106136180 filed on Oct. 20, 2017.

FIELD

The disclosure relates to a headlamp system for a vehicle, more particularly to a headlamp system controllable by a portable electronic device.

BACKGROUND

Generally, a conventional headlamp of a vehicle is configured to emit various light beam patterns, such as a low beam pattern and a high beam pattern. However, each of the light beam patterns emitted by the conventional headlamp cannot be further adjusted by a user. Further, neither luminous intensity of light emitted by each lamp of the conventional headlamp nor orientation of the conventional headlamp is adjustable.

SUMMARY

Therefore, an object of the disclosure is to provide a headlamp system capable of being controlled by a portable electronic device.

According to one aspect of the disclosure, a headlamp system includes a headlamp device and a machine-readable storage medium. The headlamp device is to be mounted on a vehicle and includes a light-emitting set, a control module, and a wireless communication module electrically connected to the control module. The machine-readable storage medium stores instructions that, when executed by a portable electronic device, cause the portable electronic device to display a control interface that includes a plurality of beam pattern options related respectively to a plurality of headlamp parameter sets, and, in response to user selection of one of the beam pattern options, output, to the wireless communication module, a corresponding one of the headlamp parameter sets that is related to said one of the beam pattern options. The control module is configured to, in response to receipt of the corresponding one of the headlamp parameter sets through the wireless communication module, control the light-emitting set to emit light based on the corresponding one of the headlamp parameter sets.

According to another aspect of the disclosure, a machine-readable storage medium stores instructions that, when executed by a portable electronic device, cause the portable electronic device to:

communicate with a headlamp device that is to be mounted on a vehicle;
display a control interface that includes a plurality of beam pattern options related respectively to a plurality of headlamp parameter sets that are related respectively to a plurality of beam patterns to be emitted by the light-emitting set; and
in response to user selection of one of the beam pattern options, output, to the wireless communication module, a corresponding one of the headlamp parameter sets that is related to said one of the beam pattern options so as to control the headlamp device to emit light based on the corresponding one of the headlamp parameter sets to form a corresponding one of the beam patterns related to the corresponding one of the headlamp parameter sets.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
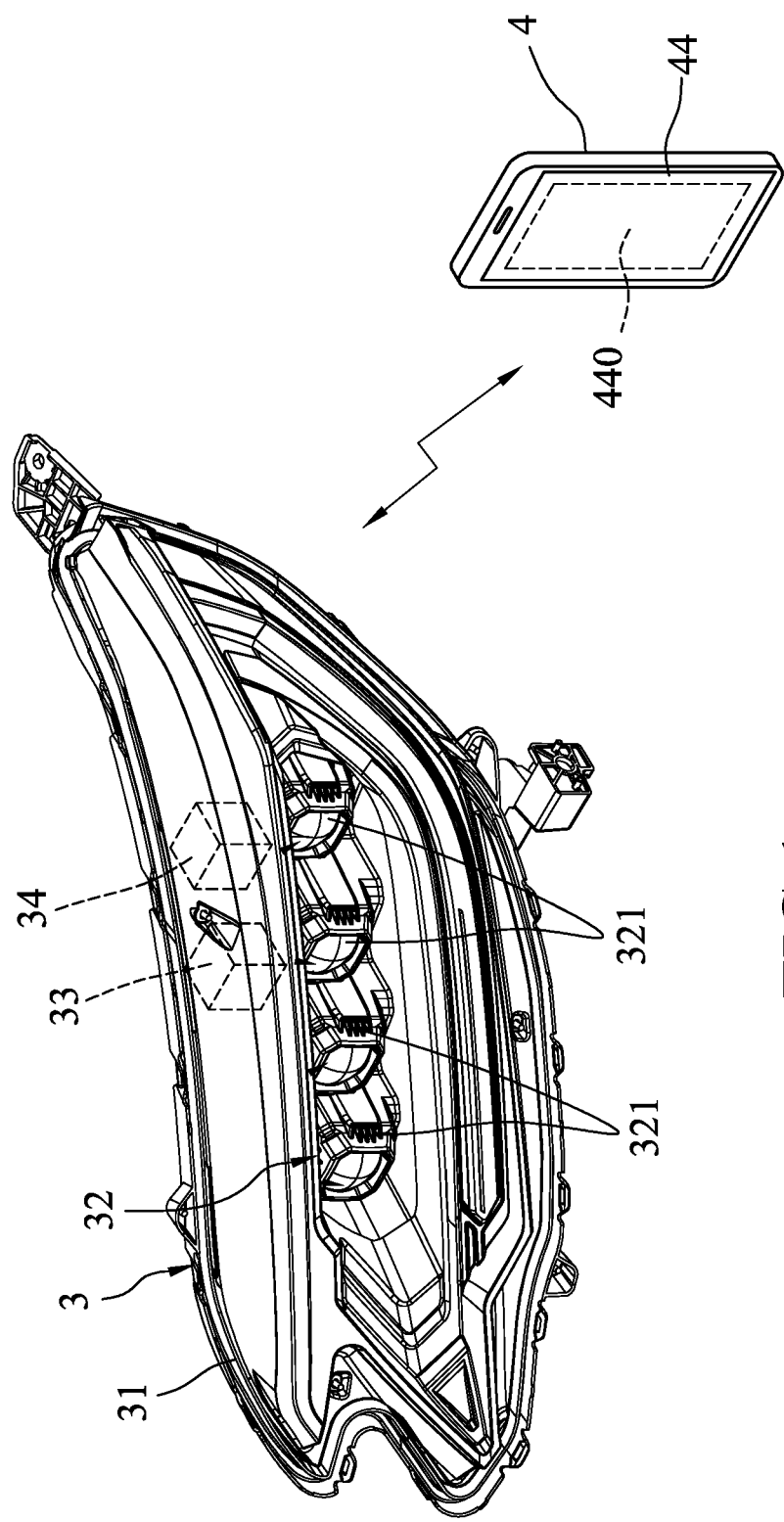
FIG. 1 is schematic perspective view of a headlamp system according to one embodiment of this disclosure.
Figure 2:
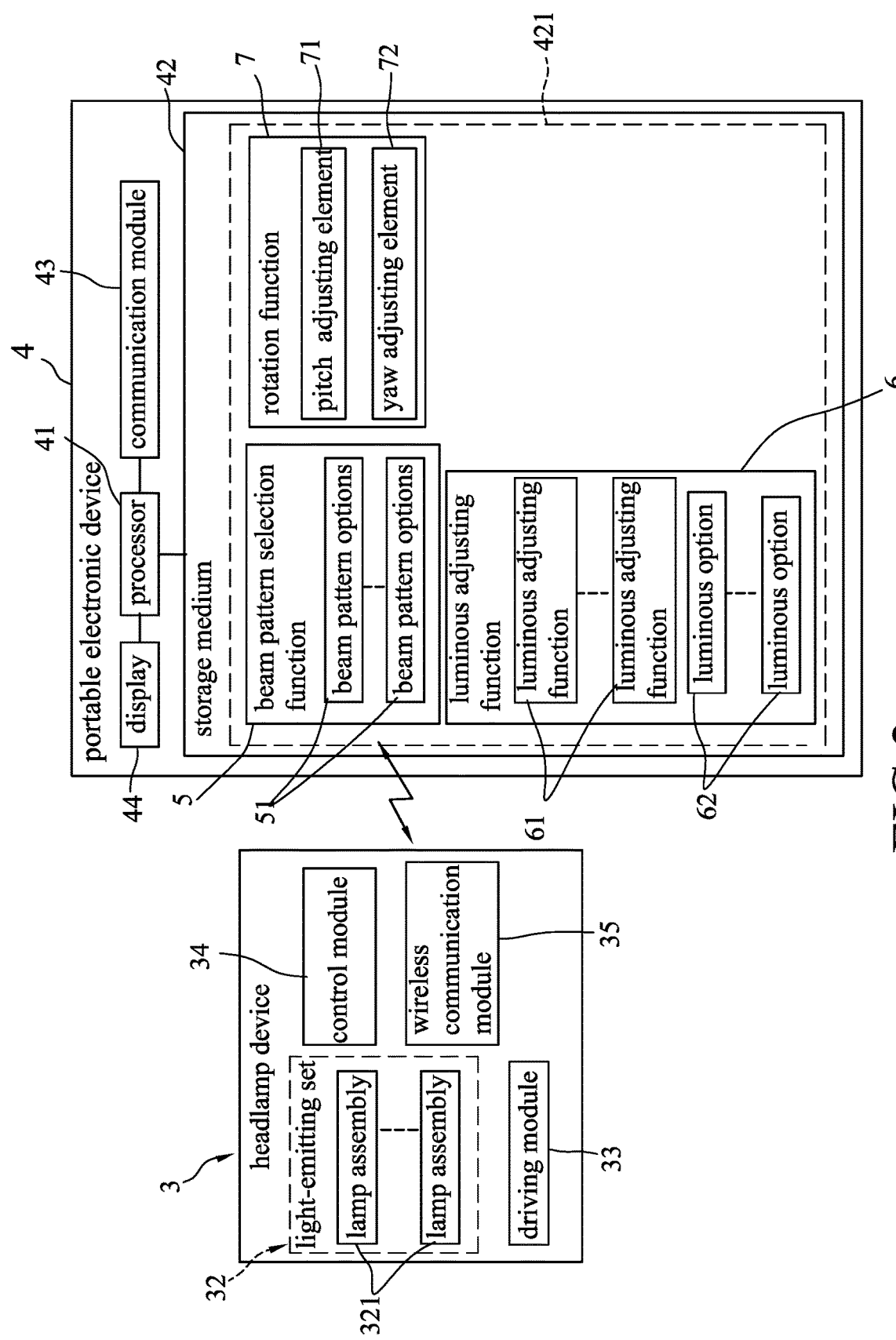
FIG. 2 is a schematic block diagram of the headlamp system according to one embodiment of this disclosure.

Referring to FIGS. 1 and 2, a headlamp system of one embodiment of the present disclosure is shown. The headlamp system includes a headlamp device 3 and a portable electronic device 4. The headlamp device 3 is to be mounted on a vehicle (not shown) and includes a housing 31, a light-emitting set 32, a driving module 33, a control module 34, and a wireless communication module 35 electrically connected to the control module 34. In some embodiments, the wireless communication module 35 and the control module 34 are integrated as one module (e.g., an integrated circuit, a system on chip, etc.). The light-emitting set 32 is communicatively connected to the control module 34 and includes a plurality of lamp assemblies 321 each including one or more lamps. The driving module 33 is, for example, a motor. The driving module 33 is communicatively connected to the control module 34, and is connected to the housing 31 and the light-emitting set 32. The driving module 33 is controlled by the control module 34 to drive the light-emitting set 32 to rotate relative to the housing 31. For example, the control module 34 may include hardware elements, such as processors, microprocessors, circuits, circuit elements (e.g., transistors, resistors, capacitors, inductors, and so forth), integrated circuits, application specific integrated circuits (ASICs), programmable logic devices (PLDs), digital signal processors (DSPs), field programmable gate arrays (FPGAs), logic gates, registers, semiconductor devices, chips, microchips, chip sets, and so forth.

The portable electronic device 4 includes a processor 41, storage medium 42, a communication module 43 and a display 44. In this embodiment, the portable electronic device 4 is a mobile phone (e.g., a smartphone) and can be, for example, a personal digital assistant (PDA), a tablet computer or a smart watch in other embodiments of the present disclosure. The storage medium 42 stores an application program (App) 421 which is downloaded from, for example, a cloud server (not shown). The storage medium 42 may include any non-transitory memory mechanism, such as read-only memory (ROM), random-access memory (RAM), magnetic disk storage media, optical storage media, flash memory, solid state devices (SSDs), and other storage devices and media.

Each of the wireless communication module 35 and the communication module 43 may include a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fourth generation (4G) of wireless mobile telecommunications technology, and/or the like.

The App 421 includes instructions that, when executed by the processor 41 of the portable electronic device 4, cause the processor 41 to control the display 44 to display a control interface 440. The control interface 440 includes a beam pattern selecting function 5 that includes a plurality of beam pattern options 51 related respectively to a plurality of headlamp parameter sets. In this embodiment, the display 44 includes a touchscreen. The headlamp parameter sets are related respectively to a plurality of beam patterns to be emitted by the light-emitting set 32. In this embodiment, each of the headlamp parameter sets is associated with at least one of the lamp assemblies 321.

In response to a user selection of one of the beam pattern options 51, the processor 41 outputs a corresponding one of the headlamp parameter sets that is related to said one of the beam pattern options 51 to the wireless communication module 35 of the headlamp device 3 via the communication module 43. Upon receipt of the corresponding one of the headlamp parameter sets by the wireless communication module 35, the control module 34 controls, based on the corresponding one of the headlamp parameter sets, each lamp assembly 321 that is associated with the corresponding one of the headlamp parameter sets to emit light in order to form a corresponding one of the beam patterns related to the corresponding one of the headlamp parameter sets. Note that the lamp assemblies 321 may emit light having a default luminous intensity or having a last-recorded luminous intensity.

The App 421 also includes instructions that, when executed by the processor 41 of the portable electronic device 4, cause the processor 41 to control the display 44 to display the control interface 440 to further include a luminous adjusting function 6 for adjusting luminous intensities of the lamp assemblies 321. Specifically, after one of the beam pattern options 51 is selected, the luminous adjusting function 6 of the control interface 440 includes, for each lamp assembly 321 that is associated with one of the headlamp parameter sets related to the selected one of the beam pattern options 51, a lamp-assembly option 61 related to the lamp assembly 321, and a plurality of luminous options 62 related respectively to a plurality of luminous parameter sets that are related respectively to a plurality of beam luminous intensities to be emitted by the light-emitting set 32. For example, the headlamp parameter set corresponding to the selected one of the beam pattern options 51 is associated with two lamp assemblies 321, and the luminous adjusting function 6 of the control interface 440 includes two lamp-assembly options 61 related to the two lamp assemblies 321, respectively. In response to a user selection of the lamp-assembly option 61 related to one of the two lamp assemblies 321 and one of the luminous options 62, the processor 41 outputs a corresponding one of the luminous parameter sets related to the selected one of the luminous options 62 to the wireless communication module 35 via the communication module 43 to control said one of the two lamp assemblies 321. In response to receipt of the corresponding one of the luminous parameter sets through the wireless communication module 35, the control module 34 adjusts luminous intensity of light emitted by said one of the two lamp assemblies 321 based on the corresponding one of the selected luminous parameter sets. That is, the selected lamp assembly 321 is controlled to emit light having one of the beam luminous intensities related to the corresponding one of the luminous parameter sets.

In one embodiment, the luminous adjusting function 6 of the control interface 440 includes a plurality of lamp-assembly options 61 related respectively to the lamp assemblies 321 of the light-emitting set 32, and a plurality of luminous options 62 related respectively to a plurality of luminous parameter sets that are related respectively to a plurality of beam luminous intensities to be emitted by the light-emitting set 32. When it is desired to adjust luminous intensity of any one of the lamp assemblies 321, one of the lamp-assembly options 61 is first selected, then one of the luminous options 62 is selected, and the processor 41 outputs the respective one of the luminous parameter sets to the wireless communication module 35 to thereby adjust luminous intensity of light outputted by the lamp assembly 321 related to the selected lamp-assembly option 61. That is to say, the luminous intensity of each of the lamp assemblies 321 can be adjusted independently as desired and the present disclosure is not limited to this respect.

The App 421 also includes instructions that, when executed by the processor 41 of the portable electronic device 4, cause the processor 41 to control the display 44 to display the control interface 440 to further include a rotation function 7 allowing user operation to set a pitch angle of a pitch rotation of the light-emitting set 32 relative to the housing 31 and a yaw angle of a yaw rotation of the light-emitting set 32 relative to the housing 31. In response to a user input related to the pitch angle and/or the yaw angle, the processor 41 outputs an angle parameter related to the user input to the wireless communication module 35 via the communication module 43. In response to receipt of the angle parameter through the wireless communication module 35, the control module 34 controls the driving module 33 to drive pitch rotation and/or yaw rotation of the light-emitting set 32 relative to the housing 31 so as to set the pitch angle and/or the yaw angle based on the angle parameter.

In this example, the rotation function 7 includes a pitch adjusting element 71 for the pitch rotation and a yaw adjusting element 72 for the yaw rotation. Each of the pitch adjusting element 71 and the yaw adjusting element 72 is, for example, a slider or a track bar allowing a user to adjust the pitch/yaw angle by moving an indicator of the slider, or a text entry box or a text field allowing a user to directly input a value of the pitch/yaw angle.

The term "processor" as used throughout the specification may refer to any device or portion of a device that processes electronic data from registers and/or memory to transform that electronic data into other electronic data. For example, the processor 41 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

To use the headlamp system of the present disclosure, the headlamp device 3 is first mounted onto a vehicle and then the user operates the portable electronic device 4 to pair the communication module 43 with the wireless communication module 35. Hereafter, the user intending to control operation of the headlamp device 3 can select a desired one of the beam patterns, adjust the luminous intensities of each (associated) lamp assembly 321 and adjust orientation of the light-emitting set 32 relative to the housing 31 through operating the control interface 440. By using the headlamp system of the present disclosure, the user is capable of controlling operation of the headlamp device 3 without replacing an electronic control unit on a vehicle and thus is relatively cost effective.

In the description above, for the purposes of explanation, numerous specific details have been set forth in order to provide a thorough understanding of the embodiment(s). It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A headlamp system comprising:
   a headlamp device to be mounted on a vehicle and including a light-emitting set, a control module, and a wireless communication module electrically connected to said control module; and
   a machine-readable storage medium storing instructions that, when executed by a portable electronic device, cause the portable electronic device to display a control interface that includes a plurality of options related respectively to a plurality of headlamp parameter sets, and, in response to user selection of one of the options, to output, to said wireless communication module, a corresponding one of the headlamp parameter sets that is related to said one of the options, wherein, in response to receipt of the corresponding one of the headlamp parameter sets through said wireless communication module, said control module is configured to control said light-emitting set to emit light based on the corresponding one of the headlamp parameter sets.

2. The headlamp system as claimed in claim 1, wherein the headlamp parameter sets are related respectively to a plurality of beam patterns to be emitted by said light-emitting set, said light-emitting set includes a plurality of lamp assemblies, each of the headlamp parameter sets is associated with at least one of said lamp assemblies, and said control module is configured, based on the corresponding one of the headlamp parameter sets, to control at least one of said lamp assemblies that is related to the corresponding one of the headlamp parameter sets to emit light forming a corresponding one of the beam patterns related to the corresponding one of the headlamp parameter sets.

3. The headlamp system as claimed in claim 2, wherein said machine-readable storage medium further stores instructions that, when executed by the portable electronic device, cause the portable electronic device to: display the control interface to further include, for each of the at least one of said lamp assemblies that is associated with the corresponding one of the headlamp parameter sets, a lamp-assembly option related to said lamp assembly, and a plurality of luminous options related respectively to a plurality of luminous parameter sets; and in response to user selection of the lamp-assembly option related to one of the at least one of said lamp assemblies and one of the luminous options, output, to said wireless communication module, a corresponding one of the luminous parameter sets that is related to said one of the luminous options, wherein said control module is configured to, in response to receipt of the corresponding one of the luminous parameter sets through said wireless communication module, adjust luminous intensity of light outputted by the one of the at least one of said lamp assemblies that is related to the lamp-assembly option based on the corresponding one of the luminous parameter sets.

4. The headlamp system as claimed in claim 1, wherein said machine-readable storage medium further stores instructions that, when executed by the portable electronic device, cause the portable electronic device to: display the control interface to further include a plurality of lamp-assembly options related respectively to said lamp assemblies of said light-emitting set, and a plurality of luminous options related respectively to a plurality of luminous parameter sets; and in response to user selection of one of the lamp-assembly options and one of the luminous options, output, to said wireless communication module, a corresponding one of the luminous parameter sets that is related to said one of the luminous options, wherein said control module is configured to, in response to receipt of the corresponding one of the luminous parameter sets through said wireless communication module, adjust luminous intensity of light outputted by one of said lamp assemblies that is related to said one of the lamp-assembly options based on the corresponding one of the luminous parameter sets.

5. The headlamp system as claimed in claim 1, wherein said headlamp device further includes a housing on which said light-emitting set is mounted, and a driving module communicatively connected to said control module and connected to said light-emitting set, said driving module being configured to, as controlled by said control module, drive said light-emitting set to rotate relative to said housing.

6. The headlamp system as claimed in claim 5, wherein said machine-readable storage medium further stores instructions that, when executed by the portable electronic device, cause the portable electronic device to display the control interface to further include a rotation function allowing user operation to set an angle of pitch rotation of said light-emitting set, and, in response to user input related to the angle of pitch rotation, to output an angle parameter related to the user input to said wireless communication module, wherein, in response to receipt of the angle parameter through said wireless communication module, said control module is configured to control said driving module to drive pitch rotation of said light-emitting set based on the angle parameter.

7. The headlamp system as claimed in claim 5, wherein said machine-readable storage medium further stores instructions that, when executed by the portable electronic device, cause the portable electronic device to display the control interface to further include a rotation function allowing user operation to set an angle of yaw rotation of said light-emitting set, and, in response to user input related to the angle of yaw rotation, to output an angle parameter related to the user input to said wireless communication module, wherein said control module is configured to, in response to receipt of the angle parameter through said wireless communication module, control said driving module to drive yaw rotation of said light-emitting set based on the angle parameter.

8. A machine-readable storage medium storing instructions that, when executed by a portable electronic device, cause the portable electronic device to:

communicate with a headlamp device mounted on a vehicle; display a control interface that includes a plurality of beam pattern options related respectively to a plurality of headlamp parameter sets that are related respectively to a plurality of beam patterns; and in response to user selection of one of the beam pattern options, output, to the headlamp device, a corresponding one of the headlamp parameter sets that is related to said one of the beam pattern options so as to control the headlamp device to emit light based on the corresponding one of the headlamp parameter sets to form a corresponding one of the beam patterns related to the corresponding one of the headlamp parameter sets.

9. The machine-readable storage medium as claimed in claim 8, the headlamp device including a plurality of lamp assemblies, each of the headlamp parameter sets being associated with at least one of the lamp assemblies, the machine-readable storage medium further storing instructions that, when executed by an portable electronic device, cause the portable electronic device to: in response to user selection of said one of the beam pattern options, output, to the headlamp device, the corresponding one of the headlamp parameter sets that is related to said one of the beam pattern options so as to control at least one of the lamp assemblies to emit light forming a corresponding one of the beam patterns related to the corresponding one of the headlamp parameter sets.

10. The machine-readable storage medium as claimed in claim 9, further storing instructions that, when executed by the portable electronic device, cause the portable electronic device to: display the control interface to further include, for each of the at least one of the lamp assemblies that is associated with the corresponding one of the headlamp parameter sets, a lamp-assembly option related to the lamp assembly, and a plurality of luminous options related respectively to a plurality of luminous parameter sets; and in response to user selection of the lamp-assembly option related to one of the at least one of the lamp assemblies and one of the luminous options, output, to the headlamp device, a corresponding one of the luminous parameter sets that is related to said one of the luminous options so as to adjust luminous intensity of light outputted by the one of the at least one of the lamp assemblies that is related to the lamp-assembly option based on the corresponding one of the luminous parameter sets.

11. The machine-readable storage medium as claimed in claim 8, further storing instructions that, when executed by the portable electronic device, cause the portable electronic device to: display the control interface to further include a plurality of lamp-assembly options related respectively to the lamp assemblies of the headlamp device, and a plurality of luminous options related respectively to a plurality of luminous parameter sets; and in response to user selection of one of the lamp-assembly options and one of the luminous options, output, to the headlamp device, a corresponding one of the luminous parameter sets that is related to said one of the luminous options, so as to adjust luminous intensity of light outputted by one of said lamp assemblies that is related to said one of the lamp-assembly options based on the corresponding one of the luminous parameter sets.

12. The machine-readable storage medium as claimed in claim 8, the headlamp device including a light-emitting set to emit light, a housing on which the light-emitting set is mounted, and a driving module to drive the light-emitting set to rotate relative to the housing, wherein the machine-readable storage medium further stores instructions that, when executed by the portable electronic device, cause the portable electronic device to display the control interface to further include a rotation function allowing user operation to set an angle of pitch rotation of the light-emitting set, and, in response to user input related to the angle of pitch rotation, to output an angle parameter related to the user input to the headlamp device to thereby control the driving module to drive pitch rotation of the light-emitting set based on the angle parameter.

13. The machine-readable storage medium as claimed in claim 8, the headlamp device including a light-emitting set to emit light, a housing on which the light-emitting set is mounted, and a driving module to drive the light-emitting set to rotate relative to the housing, wherein the machine-readable storage medium further stores instructions that, when executed by the portable electronic device, cause the portable electronic device to display the control interface to further include a rotation function allowing user operation to set an angle of yaw rotation of the light-emitting set, and, in response to user input related to the angle of yaw rotation, to output an angle parameter related to the user input to the headlamp device, to thereby control the driving module to drive yaw rotation of the light-emitting set based on the angle parameter.

* * * * *